US009917314B2

(12) United States Patent
Darling et al.

(10) Patent No.: US 9,917,314 B2
(45) Date of Patent: Mar. 13, 2018

(54) MITIGATING ELECTRODE EROSION IN HIGH TEMPERATURE PEM FUEL CELL

(75) Inventors: Robert M. Darling, South Windsor, CT (US); Paravastu Badrinarayanan, Manchester, CT (US); Carl A. Reiser, Stonington, CT (US)

(73) Assignee: Audi AG, Ingolstadt (DE)

( * ) Notice: Subject to any disclaimer, the term of this patent is extended or adjusted under 35 U.S.C. 154(b) by 1831 days.

(21) Appl. No.: 13/261,129

(22) PCT Filed: Aug. 28, 2009

(86) PCT No.: PCT/US2009/004892
§ 371 (c)(1),
(2), (4) Date: Jan. 9, 2012

(87) PCT Pub. No.: WO2011/025469
PCT Pub. Date: Mar. 3, 2011

(65) Prior Publication Data
US 2012/0115058 A1    May 10, 2012

(51) Int. Cl.
*H01M 8/04*       (2016.01)
*H01M 8/0432*     (2016.01)
(Continued)

(52) U.S. Cl.
CPC ....... *H01M 8/0432* (2013.01); *H01M 8/0488* (2013.01); *H01M 8/0491* (2013.01);
(Continued)

(58) Field of Classification Search
CPC .......... H01M 8/04559; H01M 8/0432; H01M 8/0488; H01M 8/0491; H01M 8/04753; H01M 2008/1095
See application file for complete search history.

(56) References Cited

U.S. PATENT DOCUMENTS 5,677,073 A * 10/1997 Kawatsu ........... H01M 8/04328
                                                   204/265
6,093,500 A *  7/2000 Margiott ........... H01M 8/04223
                                                   429/429
(Continued)

FOREIGN PATENT DOCUMENTS

JP      8-171921 A    7/1996
JP      2004-111255 A 4/2004
(Continued)

OTHER PUBLICATIONS

International Search Report, dated Apr. 30, 2010, for International Application No. PCT/US2009/004892, 2 pages.
(Continued)

*Primary Examiner* — Lisa S Park
(74) *Attorney, Agent, or Firm* — Seed IP Law Group LLP

(57) ABSTRACT

A method of operating a fuel cell power plant (10) including a stack (11) of fuel cells having an anode catalyst layer and a cathode electrode (15) including a catalyst layer disposed on catalyst support material is characterized by, during normal operation of said power plant, adjusting the voltage of the stack to be substantially equal to or less than a predetermined maximum voltage for the temperature of the stack. Further, said step of adjusting comprises adjusting the stack voltage to the lesser of: a) a predetermined voltage above which corrosion of catalyst support material is significant and below which corrosion of catalyst support material is insignificant at the temperature of the stack; and b) a predetermined voltage above which dissolution of catalyst is significant and below which dissolution of the catalyst is insignificant at the temperature of the stack.

14 Claims, 2 Drawing Sheets

(51) Int. Cl.
*H01M 8/04537* (2016.01)
*H01M 8/04746* (2016.01)
*H01M 8/04858* (2016.01)
*H01M 8/1018* (2016.01)

(52) U.S. Cl.
CPC ... *H01M 8/04559* (2013.01); *H01M 8/04753* (2013.01); *H01M 2008/1095* (2013.01)

(56) References Cited

U.S. PATENT DOCUMENTS

| | | | |
|---|---|---|---|
| 2002/0122966 A1* | 9/2002 | Acker | H01M 8/04007 429/431 |
| 2003/0180590 A1 | 9/2003 | Hase et al. | |
| 2004/0076860 A1* | 4/2004 | Aso | H01M 8/04589 429/430 |
| 2004/0106022 A1 | 6/2004 | Saito et al. | |
| 2007/0003805 A1* | 1/2007 | Sugawara | H01M 8/04231 429/423 |
| 2008/0032163 A1* | 2/2008 | Usborne | H01M 8/04223 429/429 |
| 2008/0085430 A1* | 4/2008 | MacBain | B60L 11/1887 429/9 |

FOREIGN PATENT DOCUMENTS

| | | |
|---|---|---|
| JP | 2004-179003 A | 6/2004 |
| JP | 2005-166550 A | 6/2005 |
| JP | 2008-282611 A | 11/2008 |
| JP | 2009-70574 A | 4/2009 |

OTHER PUBLICATIONS

Iiyama et al., "Chapter 61—Membrane and catalyst performance targets for automotive fuel cells," *Handbook of Fuel Cells—Fundamentals, Technology and Application*, vol. 6, John Wiley & Sons, Ltd., © 2009, 5 pages.

* cited by examiner

MITIGATING ELECTRODE EROSION IN HIGH TEMPERATURE PEM FUEL CELL

TECHNICAL FIELD

Corrosion of the catalyst and carbon support of electrodes in a PEM fuel cell operated above 100° C. is mitigated by ensuring that the stack voltage is regulated as a function of the stack temperature to avoid significant erosion of the electrodes. The cell voltage is held to be the lower of a) that related to avoiding significant corrosion of the electrode support material (carbon or other material) and b) that related to avoiding dissolution of catalyst.

BACKGROUND ART

Proton exchange membrane (PEM) fuel cells have attributes that make them attractive for vehicle applications. In order to regulate the temperature of the fuel cell, all of the excess heat in the coolant flowing from the fuel cell must be rejected through the radiator of the vehicle. Continuous rejection of a certain quantity of heat at a lower temperature takes a larger radiator than rejection of the same quantity of heat at a higher temperature. PEM fuel cells typically operate between 65° C. and 80° C.; this relatively low operating temperature requires that unduly large radiators must be used in the vehicles.

Membranes which are meant to operate at about 120° C. are under development. However, platinum solubility increases with temperature, and the rate of carbon corrosion increases exponentially with temperature. Therefore, degradation of the cathode catalyst and carbon support will occur more quickly at the higher temperatures.

SUMMARY

A paramount aspect of this disclosure is the discovery of the relationship between cell temperature and cell voltage in controlling the rate of electrode erosion, both of the noble metal catalyst and the carbon support of the electrode. The current through the electrode that promotes the inception of dissolution, and the current that promotes the inception of corrosion, both occur at lower voltages when temperature is higher and higher voltages when temperature is lower, as shown in FIG. 1. FIG. 1 includes a plot in solid lines of voltages above which carbon corrosion is excessive and voltages above which platinum (for example) dissolution is excessive. The dotted line indicates the lesser of the two which is the voltage that should not be exceeded in order to promote longer stack life.

Accordingly, if the voltage of an electrode is high (for instance above about 0.85 volts, with respect to a hydrogen reference electrode, or more), concurrently with a high cell temperature (for instance 100° C. {212° F.} or above), erosion of the electrode will be significant. But if the voltage is high when the temperature is low (for instance on the order of 65° C. {150° F.}) then the electrode erosion will be less. In other words, if either the cell voltage or the cell temperature is high, then, erosion will be significant unless the cell temperature or the cell voltage is concurrently low, respectively.

During normal operation of a fuel cell power plant, maximum cell voltage is regulated as a function of temperature.

Additionally, a specific feature is controlling voltage, such as by operating the power conditioner, battery charger or variable auxiliary load in a manner to adjust the fuel cell voltage to be substantially equal to or below a predetermined safe voltage for the current temperature to avoid dissolving catalyst and a predetermined safe voltage for the current temperature to avoid corrosion of carbon support. This feature can be important in power plants serving vehicles which idle (no or low power demand) frequently, causing high cell voltages.

Other variations will become more apparent in the light of the following detailed description of exemplary embodiments, as illustrated in the accompanying drawings.

MODE(S) OF IMPLEMENTATION

Figure 1:
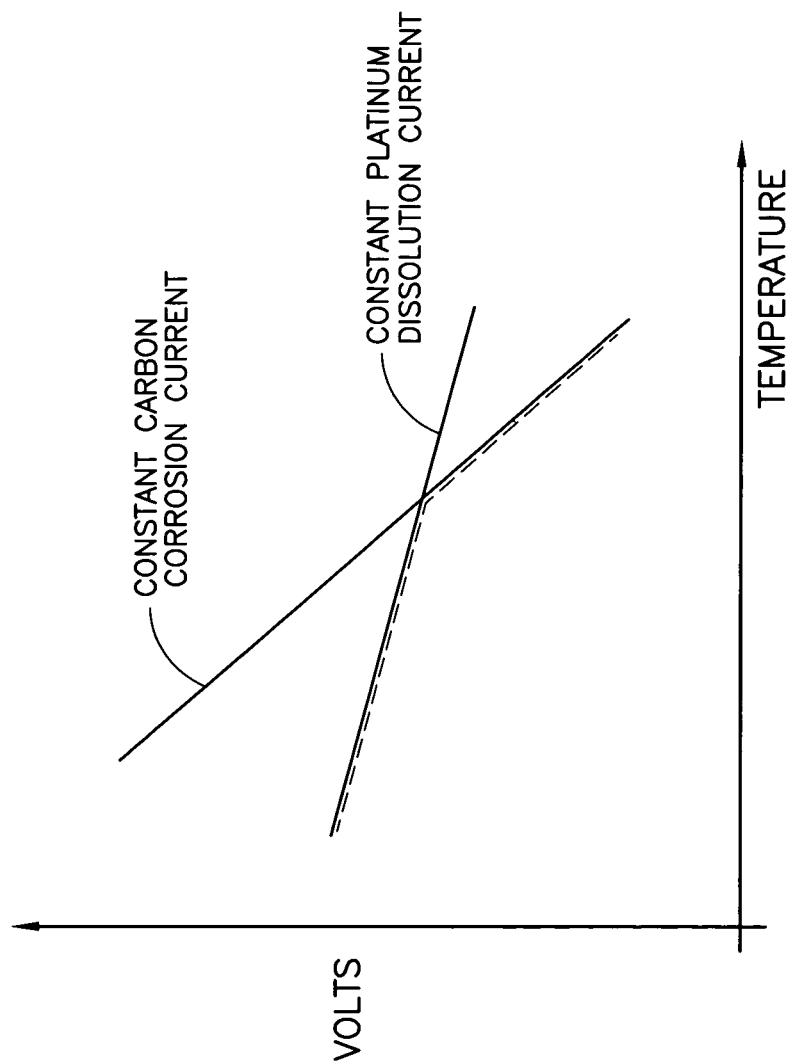
FIG. 1 is a simplified chart of maximum safe voltage, for catalyst and carbon, as a function of temperature.
Figure 2:
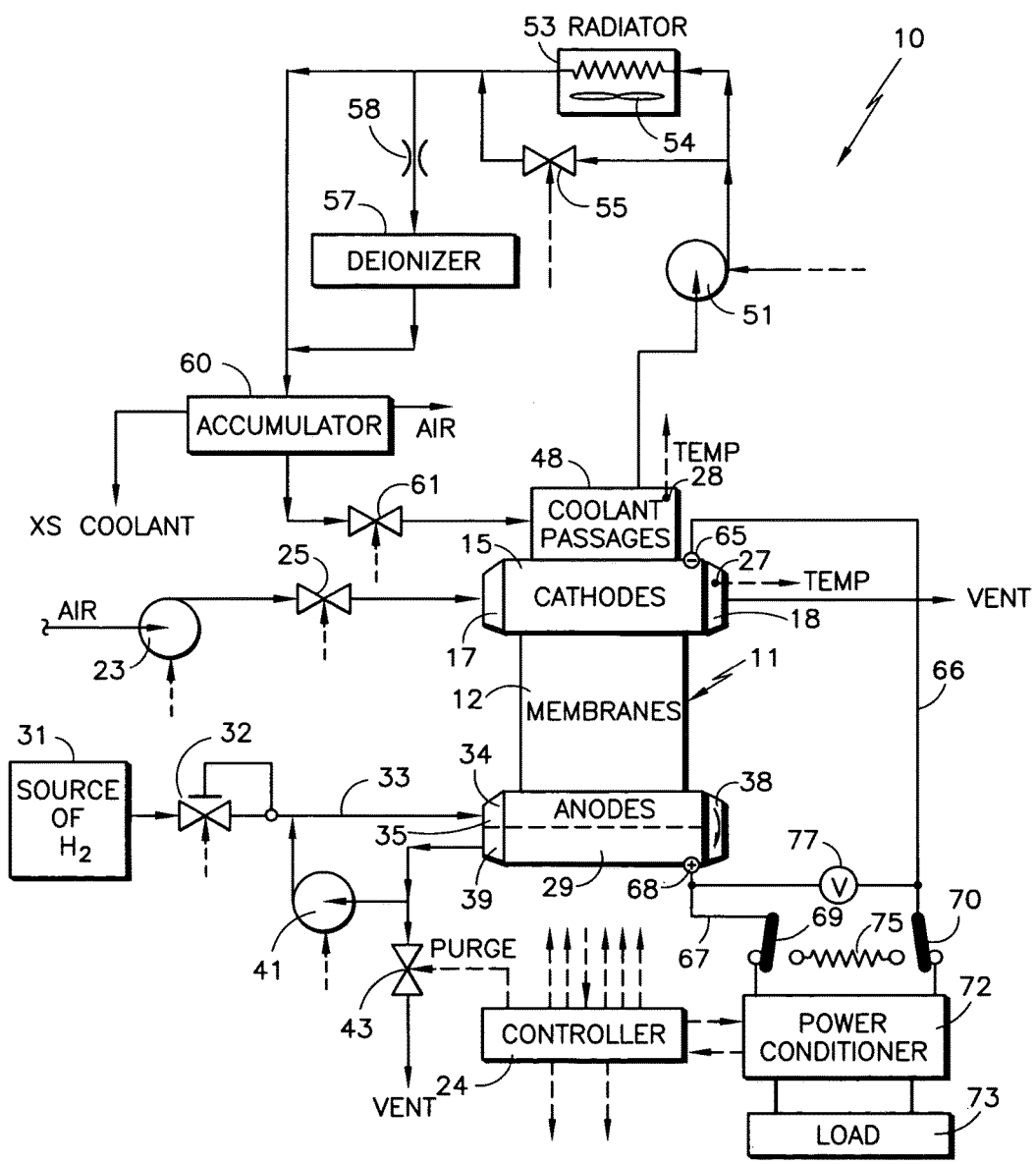
FIG. 2 is a stylized schematic block diagram of a fuel cell power plant which can perform all of the functions relating to controlling cell voltage to reduce electrode erosion, particularly in a PEM fuel cell operating in excess of 100° C. (212° F.).

A fuel cell power plant 10 includes a stack 11 of PEM fuel cells having membranes 12 capable of operating at temperatures well above 100° C., such as temperatures around 120° C. Each of the fuel cells have cathodes 15 with air flow fields in fluid communication with an air inlet manifold 17 and an air exhaust manifold 18.

Air is provided to a controllable air blower 23, the dotted arrow indicates a control input to the blower from a controller 24. An optional controllable valve 25 may be placed between the pump and the air inlet manifold 17 so as to further control the flow of air to the cathodes. A temperature sensor 27 in the exhaust manifold 18 provides an indication of cell temperature. The temperature may also, or alternatively, be monitored by a sensor 28 at the coolant exit; or at the anode exhaust, or internally of the stack, not shown.

Each of the fuel cells has an anode 29 which, in this embodiment, are shown as having a dual pass configuration. A source of hydrogen 31 may comprise a tank of industrial grade hydrogen (or better) or it may comprise a reformer with suitable gas cleansing apparatus to provide hydrogen in the form of a reformate gas, which may contain traces of CO and $CO_2$, along with small quantities of innocuous gases. The hydrogen source 31 may provide hydrogen to a remote-sense pressure regulator 32 which controls the pressure of hydrogen flowing in a fuel inlet conduit 33 to the inlet side 34 of a fuel inlet/outlet manifold 35. If the electrical load on the stack 11 is increased, the pressure of hydrogen in the anodes and therefore at the pressure regulator 32 will go down so that the pressure regulator 32 will open and provide additional hydrogen to the fuel cells. On the other hand, if the load is decreased, an excess of hydrogen will be present so that the pressure regulator 32 will decrease the amount of hydrogen being provided to the fuel cells.

After flowing through the first pass portions of the fuel flow fields, the fuel turns around in a fuel turn manifold 38 and flows through the second pass portions of the fuel cells to a fuel outlet portion 39 of the fuel inlet/outlet manifold 35. The outlet fuel is passed to a controllable fuel pump 41 to provide fuel recycle gas to the fuel inlet conduit 33. The exhausting fuel is also connected to a purge valve 43 which vents fuel exhaust to reduce the amount of nitrogen and other gases in the recycle gas.

Coolant passages 48 are provided in the stack 11 so as to control the temperature of the fuel cells and, in some configurations, assist in regulating the coolant inventory of the fuel cell power plant 10.

In cases where the air flow field plates and fuel flow field plates are solid, the coolant passages may be in cooler plates disposed between groups of fuel cells. In configurations which utilize porous, hydrophilic water transport plates, the coolant passages may be in or between the back sides of the reactant gas flow field plates.

Interconnected between the outlets and the inlets of the coolant passages 48 are a controllable coolant pump 51, a radiator 53 having a controllable fan 54 and a controllable bypass valve 55, a deionizer 57 with a flow restrictor 58 to limit the flow through the deionizer, an accumulator 60, and a coolant pressure control valve 61. Stack coolant water could be in heat exchange with glycol, which in turn would be cooled in a radiator.

The above phrases defining interconnection of coolant components between coolant passage outlets and coolant passage inlets are defined herein to encompass the interconnection of coolant components in different relative order than the express order recited in any expression herein.

The electric power output of the fuel cell stack is conducted from the cathode 65 over a line 66 and from the anode 68 over a line 67 to a pair of switches 69, 70 that, when set in the position shown, connect the stack to a power conditioner 72 which in turn feeds an electrical load 73. In general, the power conditioner converts DC to three-phase AC in phase relationship with that which is required by the load 73. However, the power conditioner can be controlled by the controller 24 so as to otherwise control the load on the stack.

Adjusting the switches 69, 70 to positions opposite to those shown in the figure will connect the stack to a variable auxiliary load 75 which is adjustable by the controller to assist in the processes of shutting down and starting up the fuel cell power plant, and to control voltage as a function of temperature, as described elsewhere herein. There could be separate auxiliary loads for start-up, shut-down, and voltage control.

A voltage sensor 77 is connected between the output lines 66, 68. The voltage is paramount in determining and controlling the voltage/temperature relationships which alter the rate of dissolving catalysts and corroding carbon, or other catalyst support material, such as that described hereinafter. In one embodiment, during normal operation of the power plant under a significant load, the coolant temperature and coolant flow are controlled either to be substantially constant, or varied as a function of cell voltage (the higher the voltage, the cooler the water). The controller can adjust the amount of coolant that is not passed through the radiator 53 by opening the bypass valve 55. This will allow the coolant to become warmer. On the other hand, the controller can cause the fan 54 to be cooling the coolant in the radiator 53 or it may shut the fan off. In this way, coolant temperature is controlled by the controller 24. The controller can also control the rate of coolant flow by controlling the speed of the coolant pump 51.

If the controller seeks a mode in which it will cause the temperature and flow of the coolant to be varied as a function of cell voltage, it will respond to the voltage sensor 77 to adjust one or more of the parameters just now described so that the amount of cooling provided by the coolant to the cells will be a function of cell temperature as determined by the temperature sensor 27. However, it is more likely to control voltage, rather than controlling temperature (other than for proper stack operation).

To reduce the amount of electrode erosion as a function of cell voltage and temperature, in the present embodiment, the cell voltage is adjusted during normal operation so as to be substantially equal to or less than a predetermined maximum cell voltage for the temperature indicated by one or more of the cell temperature sensors. The adjustment of the voltage is achieved by adjusting the electrical load, or by adjusting the volume of air flow through the cathode flow fields, to set the current density at a point along the performance curve that results in the desired voltage for the present temperature of the stack. The controller may achieve the desired cell voltage by adjusting the variable auxiliary load 75, which may typically be dynamic, utilizing circuitry, such as amplifiers, to adjust the current and control the cell voltage. Or, the variable auxiliary load may simply be resistive. The voltage may also be controlled by charging batteries (or supercapacitors) at a suitable rate.

The method herein may be used with fuel cells having catalyst layers supported on catalyst support material other than carbon. These catalyst support materials include oxides of titanium, tantalum, niobium, yttrium, molybdenum, indium and tin, as well as phosphates of yttrium, molybdenum, indium, tin, iron, titanium and tantalum.

The invention claimed is:

1. A method of operating a fuel cell power plant including a stack of fuel cells having an electric output and coolant passages having inlets and outlets, each fuel cell comprising an electrolyte disposed between an anode catalyst layer and a cathode including a catalyst layer disposed on catalyst support material, an anode fuel flow field plate on the anode side of the electrolyte and a cathode air flow field plate on the cathode side of the electrolyte, the power plant also having:
    a stack voltage sensor,
    a stack temperature sensor,
    a source providing hydrogen-containing fuel to the anode flow field plates,
    an oxidant source providing oxidant to the cathode flow field plates,
    a power conditioner connected between the electric output and a load,
    a power plant controller; and
    wherein said method comprises:
    during normal operation of said power plant, adjusting the voltage of the stack to the lesser of:
    a) a predetermined voltage above which corrosion of catalyst support material is significant at the temperature of the stack and below which corrosion of a catalyst support material is insignificant at the temperature of the stack; and
    b) a predetermined voltage above which dissolution of catalyst is significant at the temperature of the stack and below which dissolution of the catalyst is insignificant at the temperature of the stack.

2. The method according to claim 1 wherein adjusting the voltage of the stack comprises adjusting the stack voltage to be substantially equal to or less than a predetermined voltage above which erosion of an electrode is significant at the temperature of the stack and below which erosion of the electrode is insignificant at the temperature of the stack.

3. The method according to claim 1 wherein adjusting the voltage of the stack comprises adjusting the electrical load on the stack.

4. The method according to claim 3 wherein the power plant controller responds to the stack temperature sensor to regulate the load to cause the voltage of the stack indicated by the stack voltage sensor to be substantially equal to or less than the predetermined voltage.

5. The method according to claim 1 wherein adjusting the voltage of the stack comprises adjusting current flow through an auxiliary load.

6. The method according to claim 1 wherein adjusting the voltage of the stack comprises adjusting the current flow through a variable resistance.

7. The method according to claim 1 wherein adjusting the voltage of the stack comprises adjusting current flow into an electric storage device.

8. The method according to claim 1 wherein the oxidant source is controllable; and wherein adjusting the voltage of the stack comprises regulating the oxidant flow to the cathode flow field to control the voltage of the stack.

9. The method according to claim 8 wherein the power plant controller responds to the stack temperature sensor to regulate oxidant flow to cause the voltage of the stack indicated by the stack voltage sensor to be substantially equal to or less than the predetermined voltage.

10. The method according to claim 1 wherein the power conditioner is connected between the electric output and the load; and wherein adjusting the voltage of the stack comprises operating the power conditioner so as to adjust the load on the stack.

11. The method according to claim 2 wherein the predetermined voltage above which erosion of an electrode is significant at the temperature of the stack and below which erosion of the electrode is insignificant at the temperature of the stack is less than or equal to 0.85 volts with respect to a hydrogen reference electrode when the temperature of the stack is 100 degrees Celsius.

12. The method according to claim 11 wherein the electrode includes a noble metal catalyst and a carbon support.

13. The method according to claim 2 wherein the predetermined voltage above which erosion of an electrode is significant at the temperature of the stack and below which erosion of the electrode is insignificant at the temperature of the stack is greater than or equal to 0.85 volts with respect to a hydrogen reference electrode when the temperature of the stack is 65 degrees Celsius.

14. The method according to claim 13 wherein the electrode includes a noble metal catalyst and a carbon support.

\* \* \* \* \*